(12) United States Patent
Baierl et al.

(10) Patent No.: US 10,983,392 B2
(45) Date of Patent: Apr. 20, 2021

(54) VEHICLE WINDOW PANE HAVING A LIQUID CRYSTAL ARRANGEMENT

(71) Applicant: Webasto SE, Stockdorf (DE)

(72) Inventors: Daniela Baierl, Stockdorf (DE); Steffen Lorenz, Stockdorf (DE); Jonas Dietrich, Stockdorf (DE); Max Buchmann, Munich (DE); Jan Grothe, Stockdorf (DE); Oliver Heisel, Stockdorf (DE); Kim Krachenfels, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 16/621,421

(22) PCT Filed: May 29, 2018

(86) PCT No.: PCT/EP2018/064087
§ 371 (c)(1),
(2) Date: Dec. 11, 2019

(87) PCT Pub. No.: WO2018/233990
PCT Pub. Date: Dec. 27, 2018

(65) Prior Publication Data
US 2020/0201113 A1    Jun. 25, 2020

(30) Foreign Application Priority Data
Jun. 23, 2017    (DE) ............ 10 2017 113 987.7

(51) Int. Cl.
*G02F 1/1335* (2006.01)
*B32B 17/10* (2006.01)
*B60J 1/20* (2006.01)

(52) U.S. Cl.
CPC .. *G02F 1/133528* (2013.01); *B32B 17/10302* (2013.01); *B32B 17/10458* (2013.01); *B32B 17/10504* (2013.01); *B60J 1/2011* (2013.01); *B32B 17/1077* (2013.01); *B32B 17/10733* (2013.01); *B32B 17/10743* (2013.01); *B32B 17/10761* (2013.01); *B32B 17/10788* (2013.01); *B32B 17/10798* (2013.01)

(58) Field of Classification Search
CPC ......... G02F 1/133528; G02F 1/133302; G02F 1/133305; G02F 2201/54; G02F 2202/28;
(Continued)

(56) References Cited

U.S. PATENT DOCUMENTS 6,055,088 A    4/2000    Fix et al.
6,466,298 B1    10/2002    Fix et al.
(Continued)

FOREIGN PATENT DOCUMENTS

DE    11 2013 006 193 T5    9/2015
EP    0343419 A2    11/1989
(Continued)

OTHER PUBLICATIONS

International Search Report for PCT/EP2018/064087 dated Sep. 10, 2018 and English Translation enclosed herewith (7 pages).

*Primary Examiner* — Charles S Chang
(74) *Attorney, Agent, or Firm* — Fitch, Even, Tabin & Flannery, LLP (57) ABSTRACT

A vehicle window pane having a plate-like window pane body which has an outer side facing the surroundings of the vehicle and an inner side facing away from the outer side and on whose inner side a shading arrangement is disposed, the shading arrangement being formed by a liquid crystal arrangement which has a liquid crystal cell. The liquid crystal arrangement has two films between which the liquid crystal cell is disposed, and the liquid crystal arrangement is connected to the window pane body via at least one longitudinal-expansion compensation layer.

34 Claims, 8 Drawing Sheets

(58) Field of Classification Search
CPC ......... G02F 1/1333; B60J 1/2011; B60J 3/04; B32B 17/10302; B32B 17/10458; B32B 17/10504; B32B 17/10733; B32B 17/10743; B32B 17/10761; B32B 17/1077; B32B 17/10788; B32B 17/10798; B32B 17/10036
USPC .......................................................... 349/16
See application file for complete search history.

(56) References Cited

U.S. PATENT DOCUMENTS

| | | | |
|---|---|---|---|
| 2010/0315693 A1* | 12/2010 | Lam ................... | G02C 7/102 359/241 |
| 2014/0141192 A1* | 5/2014 | Fernando ............. | E06B 3/6775 428/76 |
| 2014/0176836 A1 | 6/2014 | Brecht et al. | |
| 2015/0036204 A1* | 2/2015 | Branda ................ | G02F 1/0147 359/244 |
| 2015/0367782 A1 | 12/2015 | Mannheim Astete et al. | |
| 2016/0104437 A1* | 4/2016 | Iwakawa .................. | B60J 3/04 345/690 |
| 2017/0023806 A1* | 1/2017 | Wehlus ................ | G02F 1/0126 |

FOREIGN PATENT DOCUMENTS

| | | |
|---|---|---|
| WO | 9411779 A2 | 5/1994 |
| WO | 2007/077099 A1 | 7/2007 |
| WO | 2015/117736 A1 | 8/2015 |

* cited by examiner

VEHICLE WINDOW PANE HAVING A LIQUID CRYSTAL ARRANGEMENT

CROSS-REFERENCE TO RELATED APPLICATIONS

This application is a U.S. national phase application filed under 35 U.S.C. § 371 of International Application No. PCT/EP2018/064087, filed May 29, 2018, designating the United States, which claims priority from German Patent Application No. 10 2017 113 987.7, filed Jun. 23, 2017, which are hereby incorporated herein by reference in their entirety for all purposes.

FIELD

The invention relates to a vehicle window pane having the features of the preamble of claim 1.

BACKGROUND

A vehicle window pane of this kind is known from practice and may be a displaceable or fixed roof element of a motor vehicle. The vehicle window pane comprises a plate-like window pane body, which is typically made of glass and forms the outer skin of the roof element. At its inner side, the window pane body is provided with a liquid crystal arrangement which can be electrically switched, thereby defining the translucency of the vehicle window pane. Depending on the switch state of the liquid crystal arrangement, the vehicle window pane is either largely translucent or largely opaque, thus forming a shading arrangement.

Furthermore, it is known for droplet-shaped liquid crystals to be embedded in a polymer. In the default state, the liquid crystals are unorganized, which is why substantially no light transmission is possible. The appearance is milky. If a voltage is applied to these liquid crystal cells, however, the liquid crystals align, allowing light to be transmitted.

Furthermore, it is known for what is referred to as SPD (suspended particle device) films to be used in vehicle window panes in order to provide a shading device. An SPD film comprises small rod-shaped particles in a suitable cell which are integrated in a thin plastic film and which are oriented randomly at first. An electric field causes these particles to align, allowing light to be transmitted. However, there is the problem that SPD films are producible in blue only and not in a neutral color that could be readily used in a motor vehicle.

So far, there has generally been the problem of providing curved vehicle window panes, in particular three-dimensionally curved vehicle window panes, with a liquid crystal arrangement as a shading arrangement that allows even shading at a low degree of transmission.

SUMMARY

The object of the invention is to provide a vehicle window pane according to the kind mentioned above that has a liquid crystal arrangement that exhibits even shading behavior even if a window pane body is curved three-dimensionally.

According to the invention, this object is attained by the vehicle window pane having the features of claim 1.

The invention proposes a vehicle window pane comprising a plate-like, plane or curved window pane body which has an outer side facing the surroundings of the vehicle and an inner side facing away from the outer side and on whose inner side a shading arrangement is disposed, the shading arrangement being formed by a liquid crystal arrangement which comprises a liquid crystal cell. The liquid crystal arrangement comprises two films between which the liquid crystal cell is disposed, and the liquid crystal arrangement is connected to the window pane body via a longitudinal-expansion compensation layer.

Since the liquid crystal cell is disposed between two films, the liquid crystal arrangement can conform to the shape of the plate-like and, in particular, curved window pane body, which may be made of glass or plastic, such as a polycarbonate or PMMA. This also allows the window pane body to be realized with a three-dimensional curvature, the window pane body thus having a curvature along a longitudinal direction of the window pane and a curvature along a transverse direction of the window pane. The longitudinal-expansion compensation layer, which may be elastic in particular, compensates stresses which may occur between the window pane body and the liquid crystal arrangement because of differing thermal expansion behaviors, for example. Thus, depending on the switch state of the liquid crystal cell, the liquid crystal arrangement can exhibit a constant transmissibility for light, i.e., a constant transmission behavior, across its surface, which preferably extends across a major part of the window pane body.

In the vehicle window pane according to the invention, the function of the liquid crystal cell is integrated between two films, ensuring good deformability of the liquid crystal arrangement. Additionally, a homogenous layer thickness across the entire liquid crystal cell can be achieved.

The longitudinal-expansion compensation layers preferably also have adhesive properties so that no additional adhesive layers are needed between the individual layers of the composite structure.

The window pane body may have a three-dimensional curvature. For example, the window pane body may be curved in two directions, namely along a transverse direction and along a longitudinal direction of the vehicle when a roof window pane is concerned, each curvature having a radius between 1000 mm and 10.000 mm, preferably between 2000 mm and 5000 mm, which can change across the curvature, i.e., does not have to be constant in the respective direction. The curvature radius may vary, i.e., does not have to be constant, across the curvature, i.e., in the transverse direction and/or the longitudinal direction of the window pane.

The liquid crystal arrangement of the vehicle window pane according to the invention can be operated with short switching times of about a second across a wide temperature range. Additionally, a low voltage can be enough to actuate the liquid crystal arrangement. The voltage, which is an alternating voltage, can be below 30 V, in particular. The frequency of the alternating voltage is 60 Hz, for example, but may also be higher depending on the desired speed of alignment of the liquid crystals and may be up to 100 to 120 Hz or also lower.

Furthermore, when switched off, the liquid crystal arrangement offers a very low transmission, which is below 1% for visible light. The color of the liquid crystal arrangement is grey, for example, but can be customized by admixing dyes.

In particular, the vehicle window pane according to the invention is a roof element of the vehicle in question. This roof element may be a fixed roof element which is rigidly connected to the body of the vehicle in question or a movable roof element which constitutes a lid element of a sunroof arrangement.

In a preferred embodiment of the vehicle window pane according to the invention, the longitudinal-expansion compensation layer, which is optically isotropic in particular, is an acrylate layer, a layer of thermoplastic polyurethane, an epoxy layer, a silicone layer or layer of a cross-linking material, such as ethylene-vinyl acetate (EVA) or polyvinyl butyral (PVB). To this end, a plastic film which is made of a corresponding material and whose thermoplastic and/or cross-linking reactive properties allow it to form a composite with the window pane body and a film of the liquid crystal arrangement upon heating can be used in particular during production. Of course, a different material which has elastic properties and can absorb stresses may also be used for the longitudinal-expansion compensation layer.

In order to be able to absorb the stresses between the window pane body and the liquid crystal arrangement to a large extent, the longitudinal-expansion compensation layer preferably has a thickness of at least 0.2 mm and of at least 0.4 mm in particular.

In a specific embodiment of the vehicle window pane according to the invention, a window pane inner body is disposed on the inner side of the vehicle window pane. In this case, the liquid crystal arrangement is disposed between the window pane body, which forms the outer side of the vehicle window pane, and the window pane inner body.

The window pane inner body can be realized in the same way as the window pane body. This means that both the window pane body and the window pane inner body are made of glass having a thickness of about 1.5 to 2.6 mm, for example. In a specific embodiment of the vehicle window pane according to the invention, however, the window pane inner body is made of thin glass, which is flexible and thus adjustable to a potential curvature of the plate-like window pane body. The thin glass, which may be a chemically pre-stressed glass, has a thickness between 0.1 mm and 1.5 mm, for example. The flexibility of a thin glass can compensate the thermal expansion behavior of the liquid crystal arrangement, thereby counteracting potential damage to the liquid crystal arrangement due to temperature changes.

In order to further improve the shading behavior of the vehicle window pane according to the invention, a polarizer layer is disposed between the window pane inner body and the liquid crystal arrangement in a preferred embodiment of the vehicle window pane.

Alternatively, the polarizer layer may be disposed between the window pane body and the liquid crystal arrangement.

The polarizer layer preferably has a polarization direction that is oriented at a right angle to a polarization direction of the liquid crystal cell when switched off. In that case, the switched-on state is associated with the transmission state. However, the polarization direction of the polarizer layer may also be parallel to the polarization direction of the liquid crystal cell when the liquid crystal cell is switched off, which means that the arrangement is in the transmission state in that case.

In order to be able to absorb stresses between the liquid crystal arrangement and the polarizer layer due to differing thermal expansion behaviors, the polarizer layer is preferably connected to the liquid crystal arrangement via a second longitudinal-expansion compensation layer.

The second longitudinal-expansion compensation layer, which is preferably optically isotropic, may also be made of an acrylate layer, a layer of thermoplastic polyurethane, an epoxy layer or of a silicone layer. Other possible materials, such as cross-linking materials like ethylene-vinyl acetate (EVA) or polyvinyl butyral (PVB), which have elastic properties and can absorb stresses may also be used.

The second longitudinal-expansion compensation layer preferably has a thickness of at least 0.2 mm and of at least 0.4 mm in particular.

Preferably, the second longitudinal-expansion compensation layer has a refractive index which corresponds to the refractive index of the films of the liquid crystal arrangement. In this way, multiple refraction of the light during passage through the liquid crystal arrangement, the second longitudinal-expansion compensation layer and the polarizer layer can be counteracted at least to some degree.

A third longitudinal-expansion compensation layer may be provided in order to connect the window pane inner body to the polarizer layer, the third longitudinal-expansion compensation layer being able to compensate differing thermal expansion behaviors of the polarizer layer and of the window pane inner body.

Like the other two longitudinal-expansion compensation layers, the third longitudinal-expansion compensation layer, which is preferably optically isotropic, is made of an acrylate layer, a layer of thermoplastic polyurethane, an epoxy layer, a silicone layer or a layer of a cross-linking material, such as ethylene-vinyl acetate (EVA) or polyvinyl butyral (PVB), for example, or of another material that has elastic properties and can absorb stresses.

The third longitudinal-expansion compensation layer also preferably has a thickness of at least 0.2 mm and of at least 0.4 mm in particular.

In order to accommodate the liquid crystal arrangement in the vehicle window pane according to the invention in a protected manner so that it is protected against environmental conditions, i.e., humidity and oxygen, an edge sealing which covers the edges of at least the liquid crystal arrangement and the longitudinal-expansion compensation layer is preferably provided. The edge sealing is made of an acrylate layer, a layer of thermoplastic polyurethane, an epoxy layer, a silicone layer or a layer of a cross-linking material, such as ethylene-vinyl acetate (EVA) or polyvinyl butyral (PVB), for example.

The two films of the liquid crystal arrangement are each made of a transparent film of PET (polyethylene terephthalate) or polycarbonate, for example, which preferably has a thickness between 50 µm and 250 µm. These two films each constitute a substrate on which a conductive layer for electrically connecting the liquid crystal cell to an on-board electrical system of the vehicle in question is disposed. Advantageously, an alignment layer is disposed on each of the conductive layers. The alignment layers each delimit the liquid crystal cell and serve to pre-align the liquid crystals in the liquid crystal cell. Additionally, the two alignment layers are separated from each other by spacers, making the thickness of the liquid crystal cell, in which the liquid crystals are disposed, at least largely constant across the entire liquid crystal arrangement.

In a preferred embodiment of the vehicle window pane according to the invention, the liquid crystal arrangement comprises a single liquid crystal cell, which extends at least largely across the entire liquid crystal arrangement, which preferably covers the potential see-through portion of the vehicle window pane.

Furthermore, the liquid crystal cell of the vehicle window pane according to the invention may be segmented and have switchable subunits.

In another specific embodiment of the vehicle window pane according to the invention, the liquid crystal arrangement is configured in such a manner that at least one of the two films of the liquid crystal arrangement is provided with an additional substrate layer on the side facing away from the liquid crystal cell, the additional substrate layer mechanically stabilizing the liquid crystal arrangement. The additional substrate layer can reduce and even prevent potential ripples of the liquid crystal arrangement, which, in turn, reduces the risk of defects. Moreover, the additional substrate layer can prevent humidity and oxygen from diffusing in the direction of the liquid crystal cell. The additional substrate layer can also serve to reduce thermal expansion differences between the individual layers of the layer structure of the vehicle window pane according to the invention.

Preferably, both films of the liquid crystal arrangement are provided with the additional substrate layer on their side facing away from the liquid crystal cell.

The additional substrate layer may be made of any suitable plastic material. For example, it is made of polyethylene and/or polycarbonate.

The additional substrate layer is preferably connected to the respective film of the liquid crystal arrangement via an adhesive layer, which may comprise a cross-linking material, such as ethylene-vinyl acetate (EVA). The adhesive layer may be made of a pressure-sensitive adhesive. Thermoplastic polyurethane may be used, as well.

Preferably, the additional substrate layer is laminated onto the respective film. Lamination can take place in a roll lamination process.

A specific embodiment of the vehicle window pane according to the invention comprises a light guide layer which can be or is connected to a light source via its edge. The light guide layer, which may be integrated in a one-stage process together with the liquid crystal arrangement and the potential other layers during production of the vehicle window pane, may constitute a lighting system for the interior of the vehicle in question. In particular, the light guide layer is part of what is known as an ambient lighting system of the vehicle in question. That is, in this embodiment, the functions of the switchable liquid crystal arrangement and the functions of a surface lighting system, an ambient lighting system in particular, are combined. Advantageously, the light guide layer and the liquid crystal arrangement can be controlled separately and independently, i.e., are switchable in such a manner that the liquid crystal arrangement goes into its transmission state or into its blocking state and the light guide layer is illuminated or not illuminated.

When connecting the individual layers of the vehicle window pane, the process parameters have to be adjusted to the liquid crystal arrangement and to the light guide layer in such a manner that both the adhesion of the two layers and the function of both layers is ensured.

In a specific embodiment of the vehicle window pane according to the invention, the light guide layer is disposed on the side of the liquid crystal arrangement that faces away from the surroundings of the vehicle. This means that the light guide layer is visible from the interior of the vehicle in question when it is activated, irrespective of the switch state of the liquid crystal arrangement.

In particular, the light guide layer may form an inner visible surface of the vehicle window pane.

The light guide layer may be made of any suitable materials. In particular, the light guide layer may comprise a planar glass body, which offers the advantage that additional protective layers on the inner side of the vehicle window pane may be omitted.

In an alternative embodiment of the vehicle window pane according to the invention, the light guide layer may comprise a plastic film and/or a plastic plate. This is advantageous in particular if the vehicle window pane is to be weight-optimized.

In order to be able to provide the light guide layer with specific desired illumination properties, it preferably contains scattering centers, which may be formed by nanoparticles in particular. In particular, the scattering centers are dispersed homogenously in the light guide layer.

In another specific embodiment of the vehicle window pane according to the invention, the light guide layer has a print, which defines a light pattern or may serve as a reflective layer, for example.

The liquid crystal arrangement may also have a reflective layer.

To protect the light guide layer from damage, it may additionally have a scratch-resistant coating.

The vehicle window pane according to the invention can basically be produced in different ways. For example, the individual layers of the vehicle window pane are connected by vacuum lamination or autoclaving, the composite of the individual layers being exposed to specific pressures and specific temperatures. In particular, adhesive plastic films that, when heated, form a composite with the other layers, i.e., with the window pane body, the liquid crystal arrangement, the polarizer layer and/or the window pane inner body, because of their thermoplastic or cross-linking properties can be used as longitudinal-expansion compensation layers. In a specific vacuum lamination process, the composite is heated from one side by a heating plate, the composite being exposed to pressure via a pressure difference in a chamber which is split in two by a membrane. In the case of production in an autoclave chamber, the laminate is heated from all sides by means of circulating air. Air pressures of up to about 15 bar can be set.

Alternatively, the vehicle window pane according to the invention may be produced by what is known as optical bonding, in which optically highly transparent and non-yellowing adhesives are used as longitudinal-expansion compensation layers. Silicones, which have high temperature stability and can be removed without damage later, may be used in particular. Polyurethanes, acrylates or epoxies may be used, as well.

The invention also relates to a method for producing a vehicle window pane, the method comprising the following steps:

preparing a structure made of multiple layers in a stack in a frame, the structure comprising a window pane body, a liquid crystal arrangement which comprises a liquid crystal cell and two films between which the liquid crystal cell is disposed, and a longitudinal-expansion compensation layer between the liquid crystal arrangement and the window pane body, at least the liquid crystal arrangement and the longitudinal-expansion compensation layer being placed in a frame which defines their position relative to each other;

introducing the structure including the frame into a vacuum bag;

evacuating the vacuum bag and applying pressure to the vacuum bag so that the layers of the structure become joined;

removing the composite structure from the vacuum bag.

The method thus realized makes it possible to cleanly and accurately join the layers of the structure of the vehicle window pane and to thus realize, without further process steps, a vehicle window pane that can be installed on the vehicle in question.

In order to improve and/or accelerate the joining of the individual layers of the structure, the structure placed in the vacuum bag is heated while it is exposed to pressure. The temperatures to which the structure is heated are between 50° C. and 150° C., for example. The pressure exerted on the vacuum bag is preferably in a range between 1 bar and 20 bar, in particular between 1 bar and 12 bar. This process can be performed in an autoclave chamber.

In order to stabilize the frame, it can be covered with a pressure plate. The pressure plate constitutes an auxiliary structure that ensures that the individual layers of the structure retain their shape during the joining process.

In correspondence with the vehicle window pane according to the invention, the structure may have a window pane inner body, a polarizer layer and/or a light guide layer.

If a light guide layer is integrated into the structure, both a switchable film in the form of the liquid crystal arrangement and a panel illumination system in the form of the light guide layer can be integrated into the vehicle window pane in a one-stage process using the method according to the invention.

Additionally, at least one of the two films may be provided with an additional substrate layer which mechanically stabilizes the liquid crystal arrangement. In particular, the additional substrate layer is laminated onto the respective film of the liquid crystal arrangement before the structure is placed in the frame. Preferably, both films of the liquid crystal arrangement are provided with an additional substrate layer.

Other advantages and advantageous embodiments of the subject-matter of the invention are apparent from the description, the drawing, and the claims.

An embodiment of a vehicle window pane according to the invention is illustrated in a schematically simplified manner in the drawing and will be explained in more detail in the following description.

DETAILED DESCRIPTION

Figure 1:
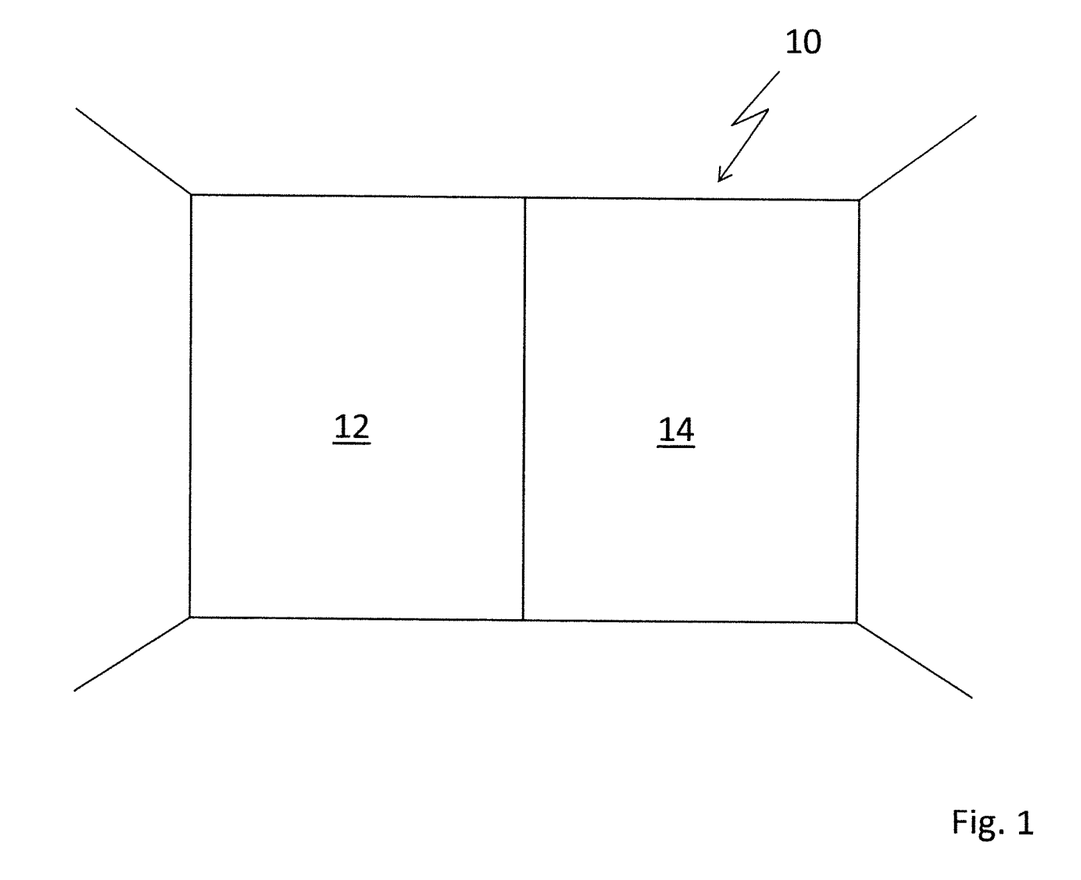
FIG. 1 is a top view of a vehicle roof having a vehicle window pane according to the invention.

FIG. 1 shows a vehicle roof 10 of a motor vehicle (not shown in detail). Vehicle roof 10 is a panoramic sunroof, which is provided with a displaceable lid element 12 and a fixed roof element 14. They are each realized as a glass element and, thus, as a vehicle window pane. Lid element 12 and fixed roof element 14 each have the same layer structure, which is provided with a shading arrangement and illustrated in FIG. 2a.

Figure 2A:
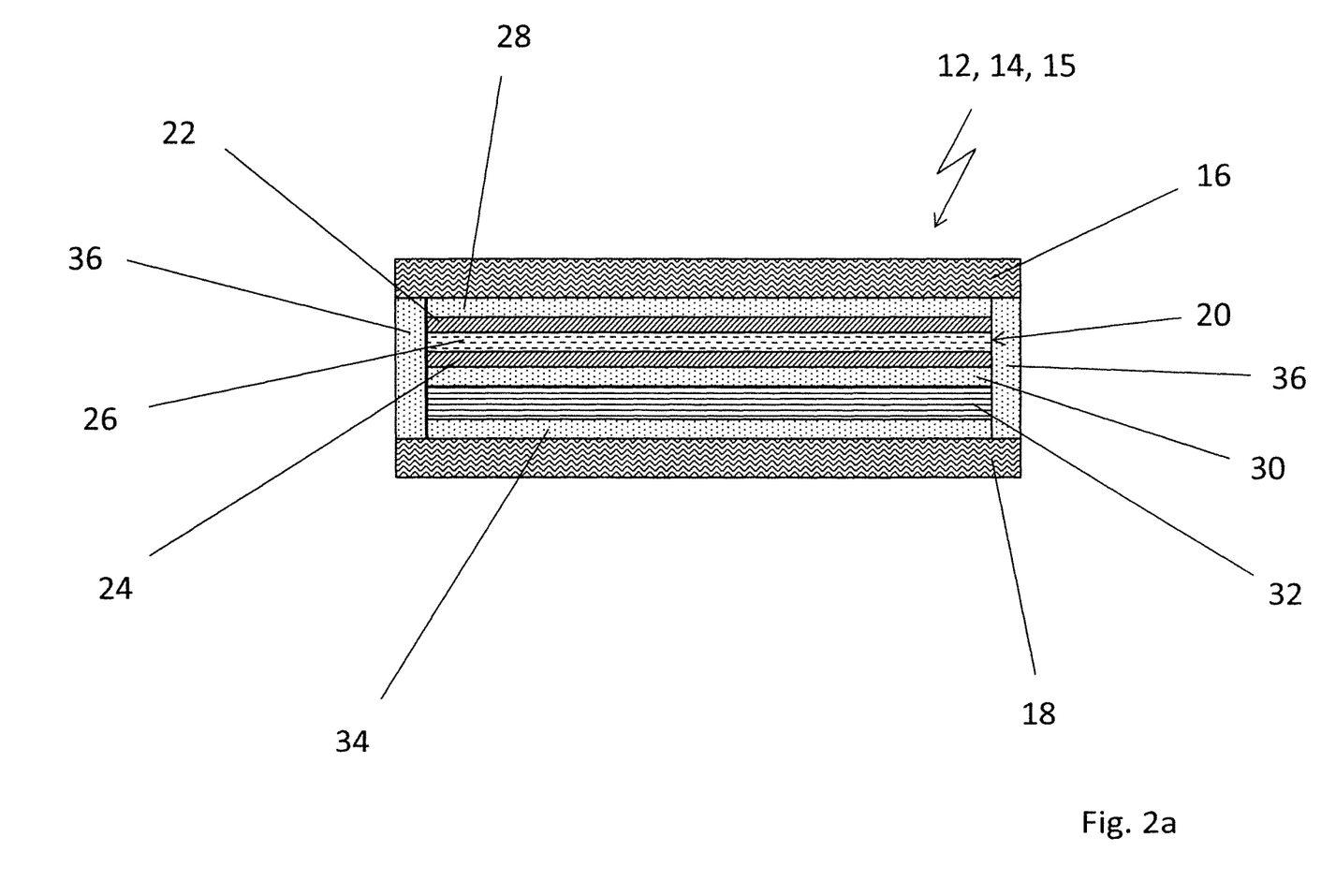
FIG. 2a is a section through the vehicle window pane, showing the layer structure thereof.

Roof elements 12 and 14, which are each realized as a vehicle window pane, each comprise a window pane arrangement 15 having a window pane body 16 made of a glass plate which is curved in a longitudinal direction and in a transverse direction of the roof and which forms the outer skin of the vehicle window pane in question. At the inner side, each vehicle window pane comprises a window pane inner body 18, which is also made of a curved glass plate. Window pane body 16 and window pane inner body 18 each have a thickness of about 2.1 mm and a corresponding three-dimensional curvature.

A liquid crystal arrangement 20, which forms a shading arrangement, is disposed between window pane body 16 and window pane inner body 18, liquid crystal arrangement 20 comprising two films 22 and 24 of PET or polycarbonate, between which a single liquid crystal cell 26 is disposed. The two transparent films 22 and 24 each have a thickness of about 100 μm. In order to be able to switch liquid crystal cell 26 between a transmission state and a blocking state, conductive layers are integrated in liquid crystal arrangement 20 on the inner sides of films 22 and 24, the conductive layers being connected to an on-board electrical system of the vehicle in question via corresponding contacts (not shown). Respective alignment layers 221 and 241 are preferably disposed on the conductive layers, alignment layers 221 and 241 delimiting liquid crystal cell 26. Alignment layers 221 and 241 serve to pre-align the liquid crystals of liquid crystal cell 26 in the switched-off state and may each be made of a polyimide or a UV-curing acrylate.

Liquid crystal arrangement 20 is connected to window pane body 16 via a longitudinal-expansion compensation layer 28, which has adhesive properties. On the side facing away from window pane body 16, a polarizer layer 32 is connected to liquid crystal arrangement 20 via a second longitudinal-expansion compensation layer 30, polarizer layer 32 comprising a linear polarizer whose polarization direction is oriented at a right angle to the polarization direction of liquid crystal cell 26 when in its blocking position. Polarizer layer 32 is connected to window pane inner body 18 via another longitudinal-expansion compensation layer 34.

Longitudinal-expansion compensation layers 28, 30 and 34, which each have adhesive properties and connect window pane body 16, liquid crystal arrangement 20, polarizer layer 32 and window pane inner body 18, each have a thickness of about 0.4 mm and are each made of an acrylate layer, a layer of thermoplastic polyurethane, an epoxy layer, a silicone layer or a layer of a cross-linking material, such as ethylene-vinyl acetate (EVA) or polyvinyl butyral (PVB). Furthermore, the layer composite forming the vehicle window panes comprises an edge sealing 36, which covers the edges of longitudinal-expansion compensation layers 28, 30 and 34 and of liquid crystal arrangement 20 and of polarizer layer 32 and which is disposed between glass body 16 and glass inner body 18.

Figure 2B:
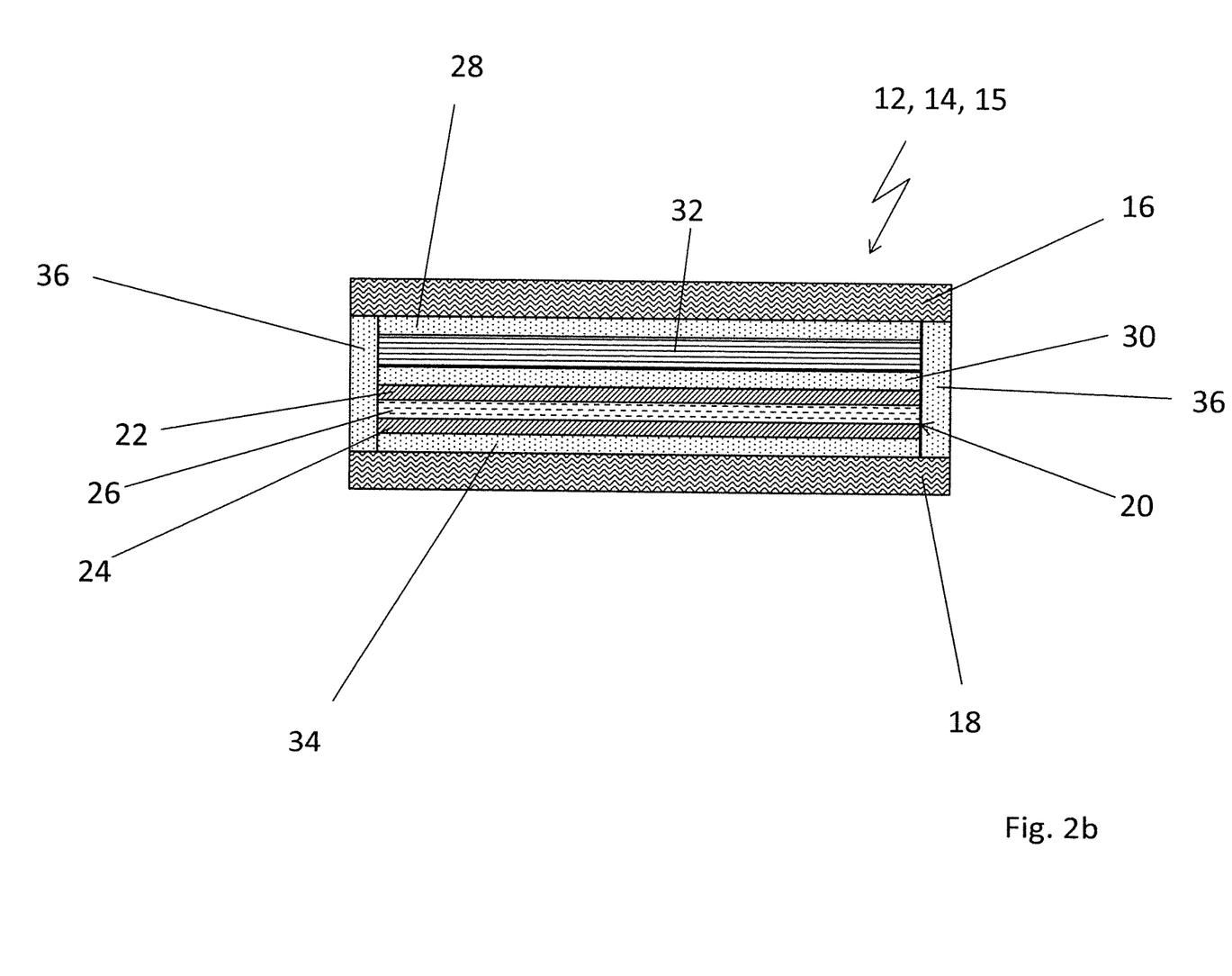
FIG. 2b is a section through an alternative embodiment of a vehicle window pane.

FIG. 2b illustrates a window pane arrangement 15, which substantially corresponds to the window pane arrangement of FIG. 2a but differs from it in that polarization layer 32 is disposed between glass body 16 and liquid crystal arrangement 20. Longitudinal-expansion compensation layers 28, 30 and 34 are disposed between glass body 16 and polarization layer 32, between polarization layer 32 and liquid crystal arrangement 20 and between liquid crystal arrangement 20 and window pane inner body 18.

Figure 3:
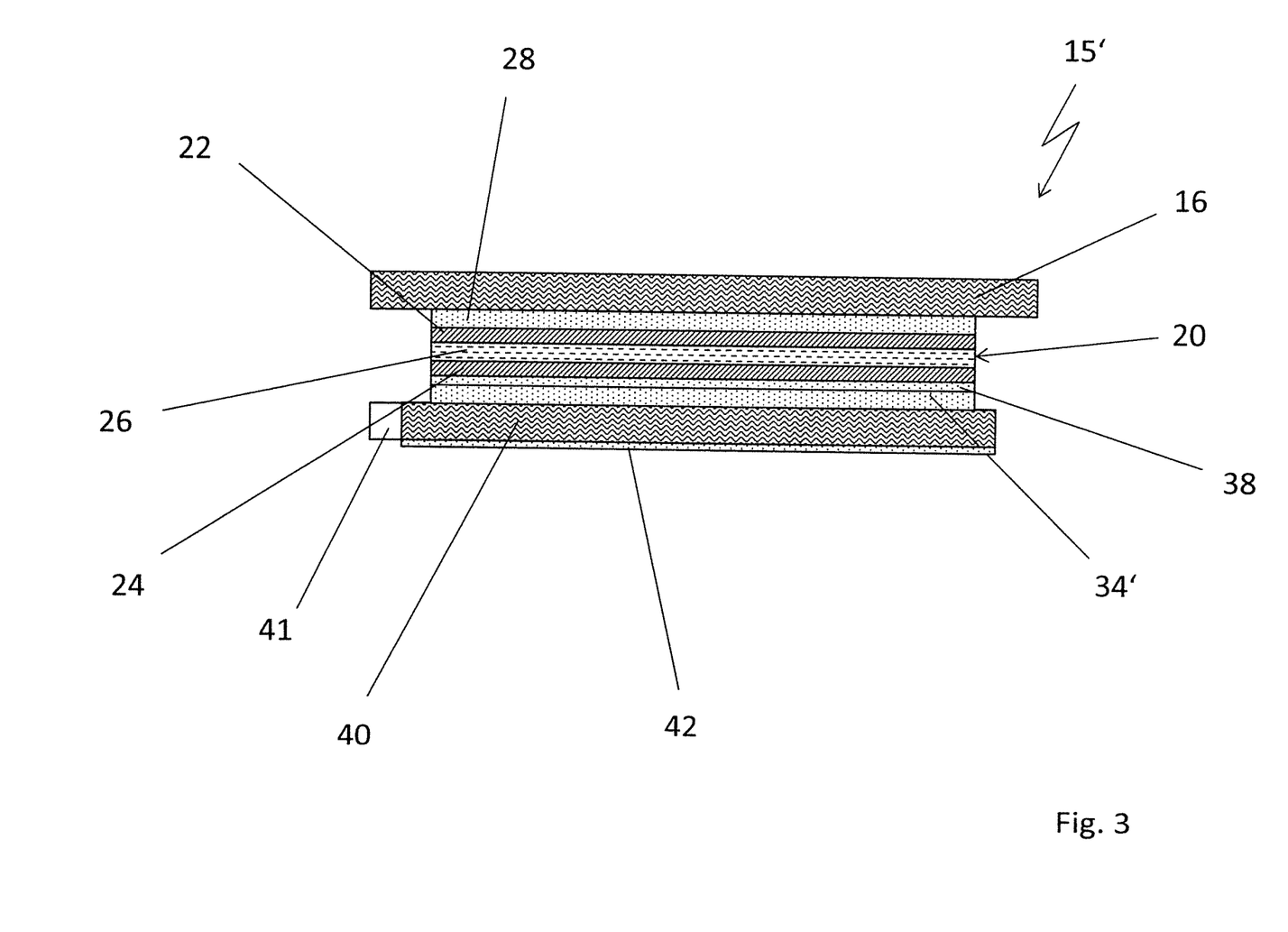
FIG. 3 is a section through another alternative embodiment of a vehicle window pane, which comprises a liquid crystal arrangement and a light guide layer.

FIG. 3 shows an alternative window pane arrangement 15' for use in a lid element or in a fixed roof element of the kind illustrated in FIG. 1. Window pane arrangement 15' has a window pane body 16, to the inner side of which a liquid crystal arrangement 20 is connected via a longitudinal-expansion compensation layer 28, which has adhesive properties. In correspondence with the embodiment of FIG. 2, liquid crystal arrangement 20 comprises two films 22 and 24 of PET or polycarbonate, between which a single liquid crystal cell 26 is disposed. Likewise, conductive layers are disposed on the inner sides of films 22 and 24, the conductive layers being connectable to an on-board electrical system of the vehicle in question via corresponding contacts (not shown). Thus, liquid crystal cell 26 can be switched back and forth between a transmission state and a blocking state.

On the side facing away from window pane body 16, which is made of single-pane safety glass, liquid crystal arrangement 20 is provided with a barrier film 38, which prevents diffusion of humidity and oxygen into liquid crystal arrangement 20.

Via another longitudinal-expansion compensation layer 34', a light guide layer 40 is connected to liquid crystal arrangement 20, light guide layer 40 being made of a thin plastic plate of PMMA (polymethyl methacrylate) or the like, in which nanoparticles are embedded so as to produce scattering centers. On the inner side, i.e., the side facing the vehicle interior, light guide layer 40 is additionally provided with a scratch-resistant coating (hard coat) 42.

Light guide layer 40 is connected to a light source 41 via its circumferential edge in such a manner that light can be coupled into light guide layer 40 in a corresponding switch state of light source 41 and that light guide layer 40 can thus be used as a lighting fixture for the vehicle interior in question.

Longitudinal-expansion compensation layers 28 and 34' are realized in the same way as the longitudinal-expansion compensation layers of the embodiment of FIG. 2.

Furthermore, like in the embodiment of FIG. 2, a polarizer layer may additionally be disposed between liquid crystal arrangement 20 and light guide layer 40 in the layer structure of FIG. 3.

As is apparent from the embodiments above, two functions are integrated in the layer structure illustrated in FIG. 3, namely a shading function in the form of switchable liquid crystal arrangement 20 together with the potentially provided polarizer layer on the one hand and an illumination function in the form of light guide layer 40 on the other hand. Both functions can be controlled separately.

Figure 4:
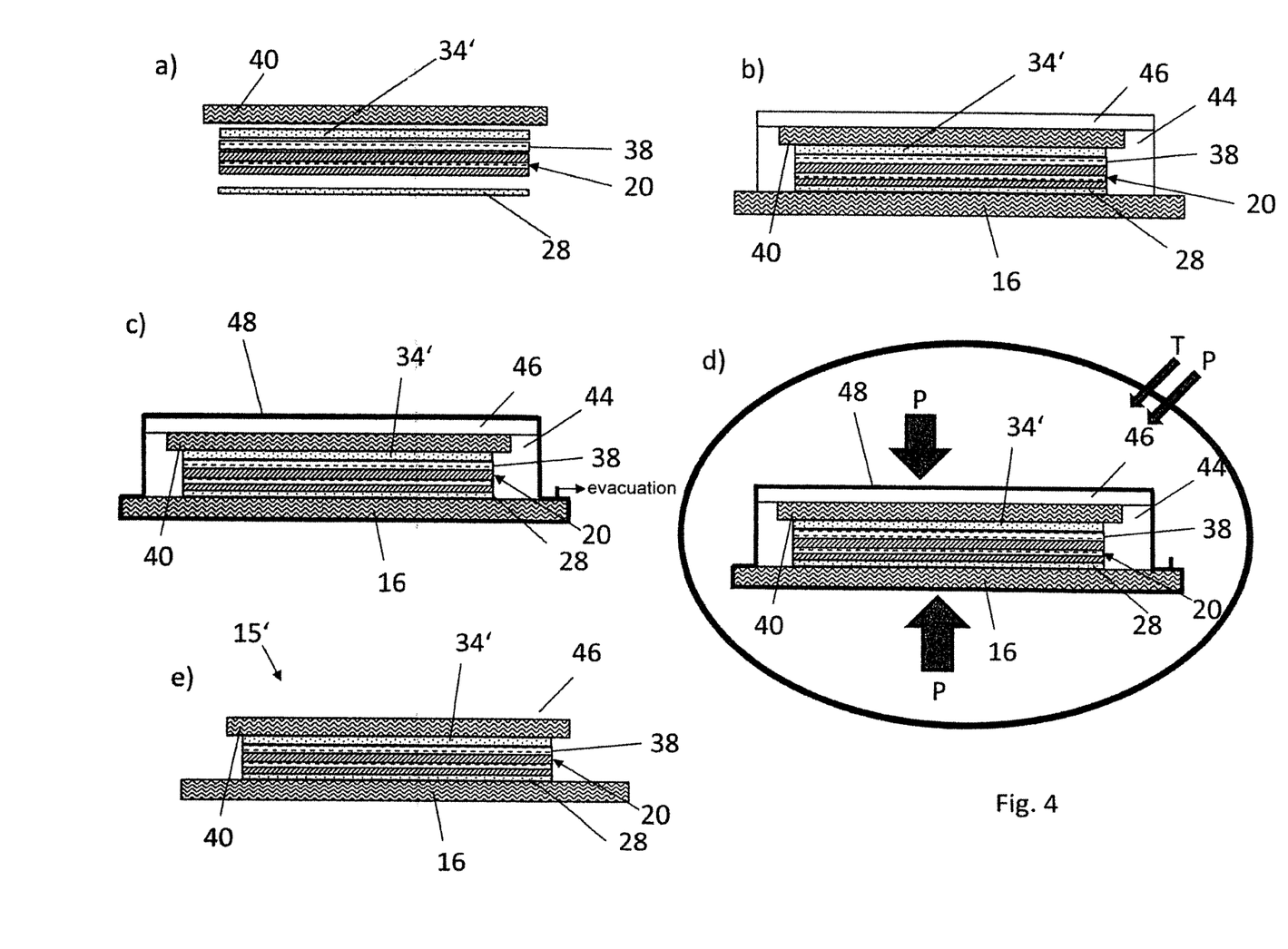
FIGS. 4a to e show the production of the vehicle window pane of FIG. 3.

Window pane arrangement 15', which is illustrated in FIG. 3 and which forms a lamination structure, is produced in the following manner as illustrated in FIG. 4.

First, light guide layer 40, liquid crystal arrangement 20, which is provided with barrier film 38, and longitudinal-expansion compensation layers 28 and 34' are provided (FIG. 4*a*) and then arranged in a frame 44 as a stack and placed on window pane body 16. Frame 44 is made of PTFE. Additionally, a pressure plate 46 is placed on light guide layer 40, which is disposed on top and provided with scratch-resistant coating 42, so that a tight connection is formed between the individual layers placed on window pane body 16 (FIG. 4*b*). Then, frame 44, together with the layer structure comprising window pane body 16, longitudinal-expansion compensation layers 28 and 34', liquid crystal arrangement 20, light guide layer 40 and pressure plate 46, is introduced into a vacuum bag 48 (FIG. 4*c*).

Vacuum bag 48 is then evacuated and subjected to increased pressure P and an increased temperature T in a chamber, which causes the layers of the layer structure, i.e., window pane body 16, longitudinal-expansion compensation layer 28, liquid crystal arrangement 20, longitudinal-expansion compensation layer 34' and light guide layer 40, to become joined (FIG. 4*d*). Subsequently, composite window pane arrangement 15' can be removed from vacuum bag 48 and demolded from frame 44 (FIG. 4*e*).

Figure 5:
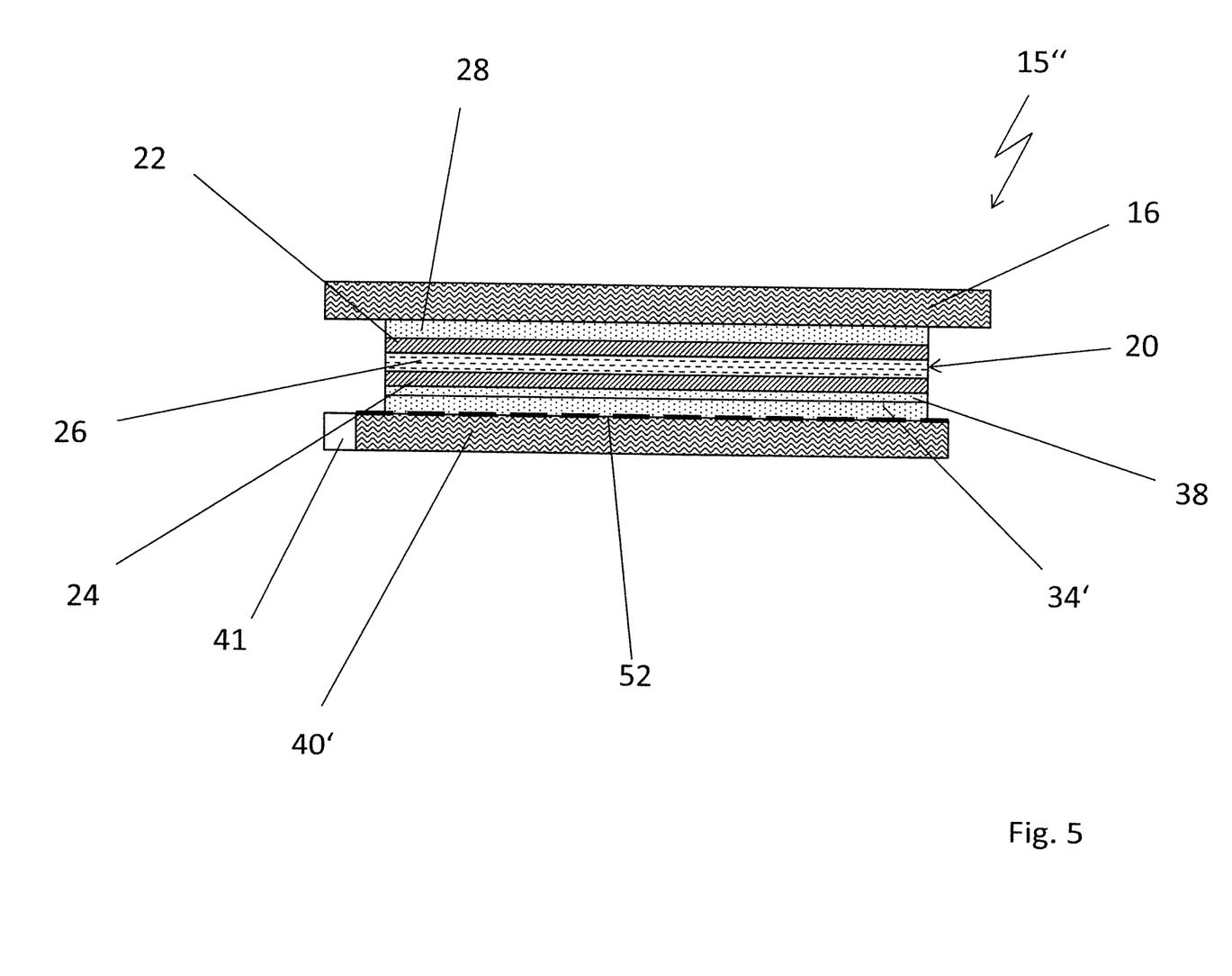
FIG. 5 is a section through another alternative embodiment of a vehicle window pane according to the invention.

FIG. 5 shows another alternative embodiment of a window pane arrangement 15" for use in a lid element or in a fixed roof element of the kind illustrated in FIG. 1. Window pane arrangement 15" also comprises a window pane body 16 to the inner side of which a liquid crystal arrangement 20 is connected via a longitudinal-expansion compensation layer 28, which has adhesive properties, liquid crystal arrangement 20 being configured according to the embodiment of FIGS. 2 and 5. Again, the side of liquid crystal arrangement 20 that faces away from window pane body 16 is provided with a barrier film 38 which prevents humidity and/or oxygen from diffusing in the direction of liquid crystal arrangement 20 and which may consist of a vapor-deposited oxide layer.

A light guide layer 40' is connected to liquid crystal arrangement 20 via another longitudinal-expansion compensation layer 34', light guide layer 40', which may be considered a window pane inner body, consisting of a clear class panel. Light guide layer 40' forms the inner visible surface of window pane arrangement 15". On its side that faces away from its inner visible surface, light guide layer 40' is provided with a printed pattern 52, which supports the effect of light guide layer 40 as an ambient lighting feature. At its circumferential edge, light guide layer 40', when installed, is connected to at least one light source 41 by means of which light can be coupled into light guide layer 40'.

In the embodiment illustrated in FIG. 5, too, two functions are integrated, namely a shading function in the form of switchable liquid crystal arrangement 20 together with a polarizer layer potentially provided additionally on the one hand and an illumination function in the form of light guide layer 40', which is or can be connected to switchable light source 41, on the other hand. Again, both functions can be controlled independently.

Figure 6:
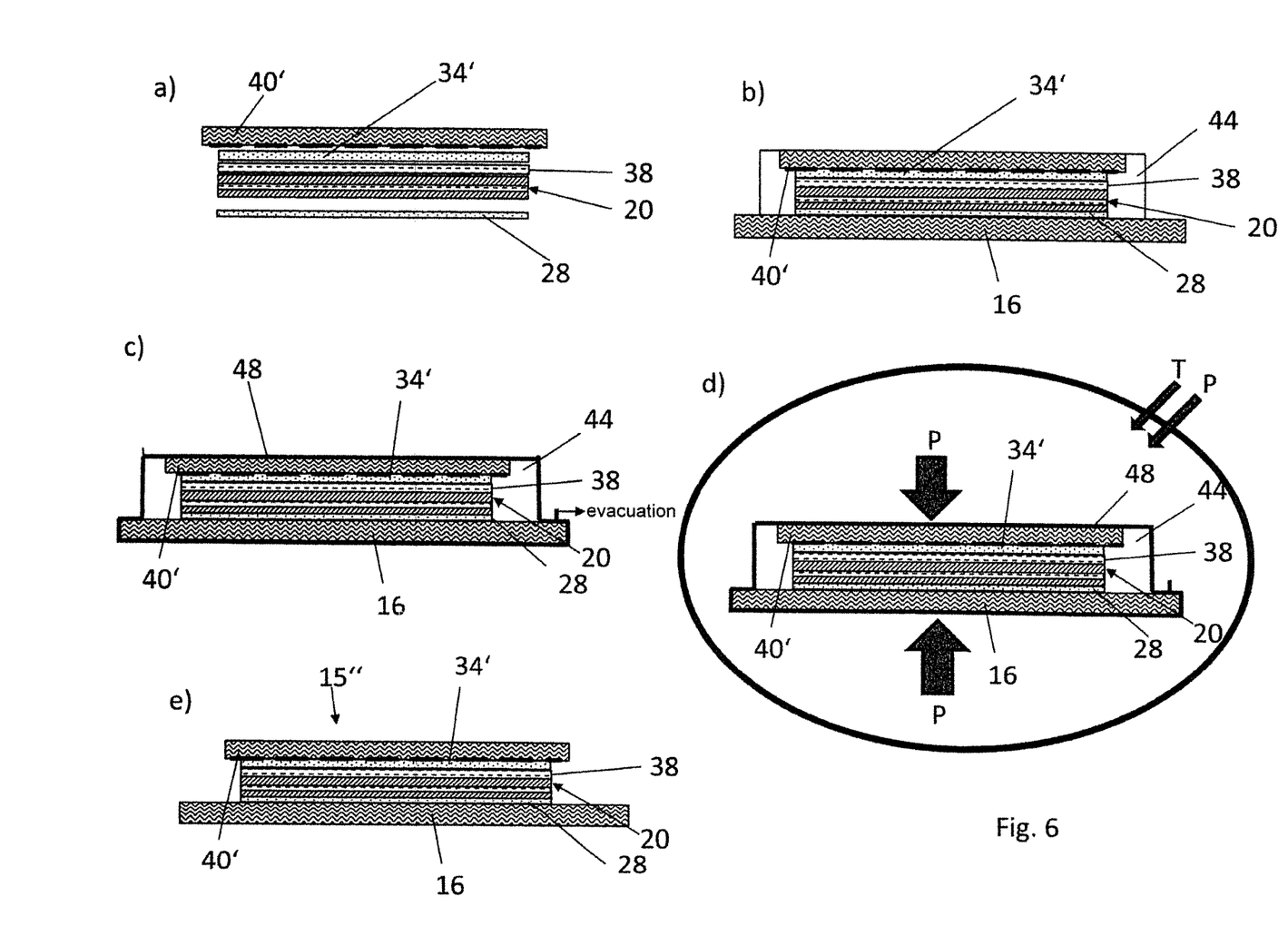
FIGS. 6a to e show the production of the vehicle window pane of FIG. 5.

Production of window pane arrangement 15", which is illustrated in FIG. 5 and forms a lamination structure, is substantially analogous to the production (FIG. 4) of the window pane arrangement of FIG. 3 and is illustrated in FIG. 6.

In a first step, longitudinal-expansion compensation layer 28, liquid crystal arrangement 20 with barrier film 38, longitudinal-expansion compensation layer 34 and pre-cut light guide layer 40', which is formed by a glass panel, are provided (FIG. 6*a*). These layers, which are to form a layer structure with window pane body 16 once joined, are then placed in a frame 44 on window pane body 16 as a stack. Frame 44 maintains the relative position of said individual layers of the layer structure (FIG. 6*b*). Then, window pane body 16, together with frame 44, which accommodates said layers, is introduced into a vacuum bag (FIG. 6*c*), which is subsequently evacuated and subjected to increased pressure and an increased temperature. This causes light guide layer 40', liquid crystal arrangement 20 and window pane body 16 to become joined in one process step (FIG. 6*d*). Subsequently, the finished product, i.e., window pane arrangement 15", can be removed from vacuum bag 48 and, after having been detached from frame 44, can be made available for use in a sunroof lid element, a fixed roof element or the like (FIG. 6e).

Figure 7:
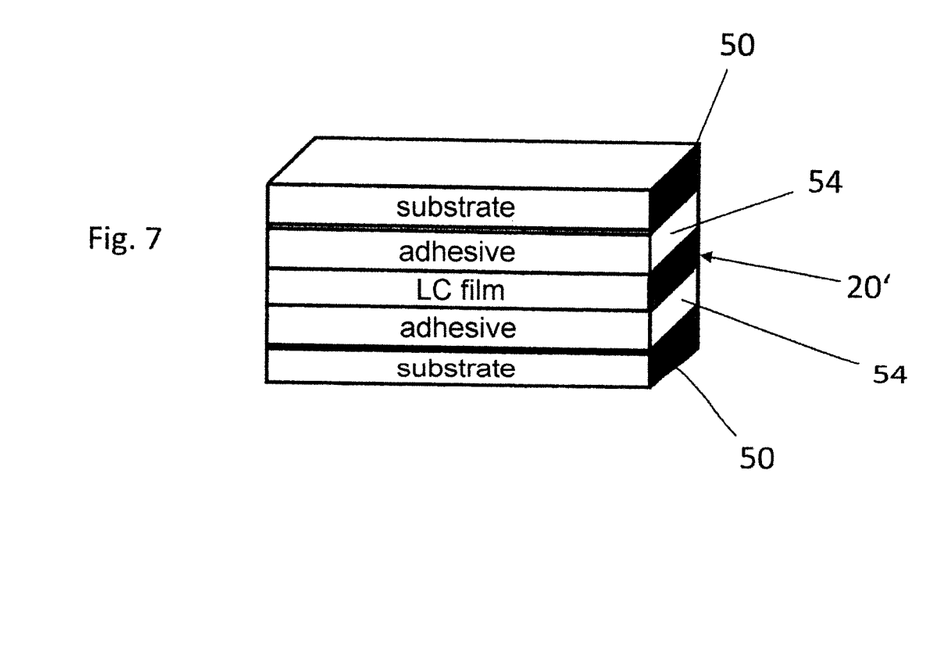
FIG. 7 is a schematic perspective section through a liquid crystal arrangement having additional substrate layers.

FIG. 7 illustrates a liquid crystal arrangement 20', which is provided with additional substrate layers on both sides, each substrate layer consisting of PET or polycarbonate and providing liquid crystal arrangement 20' with additional rigidity. Additional substrate layers 50 are each connected to films 22 and 24, respectively, of liquid crystal arrangement 20' via an adhesive layer 54 of ethylene-vinyl acetate, which may be in the form of a pressure-sensitive adhesive (PSA).

Figure 8:
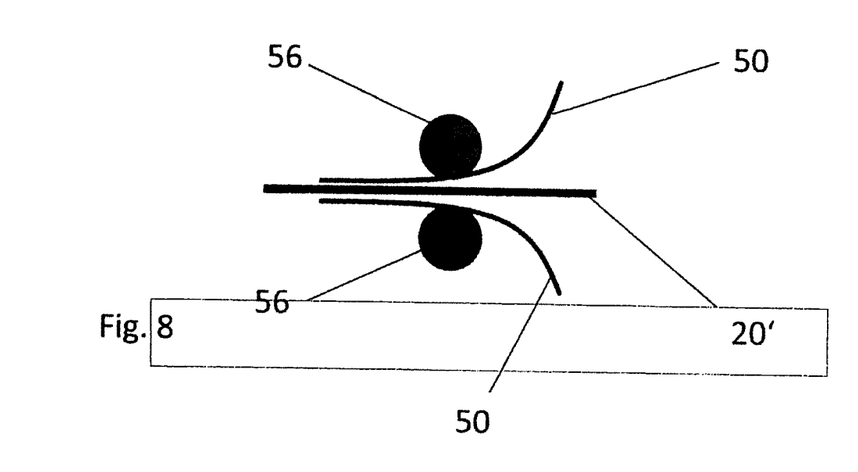
FIG. 8 shows the application of the additional substrate layers to the liquid crystal arrangement.

As can be seen in FIG. 8, additional substrate layers 50 can be connected to liquid crystal arrangement 20' using rolls or rollers 56 in a roll lamination process. Liquid crystal arrangement 20', together with additional substrate layers 50, may replace the respective liquid crystal arrangements in the embodiments of FIGS. 2, 3 and 5.

REFERENCE SIGNS 10 vehicle roof
12 lid element
14 fixed roof element
15, 15', 15" window pane arrangement
16 window pane body
18 window pane inner body
20 liquid crystal arrangement
22 film
24 film
26 liquid crystal cell
28 longitudinal-expansion compensation layer
30 longitudinal-expansion compensation layer
32 polarizer layer
34, 34' longitudinal-expansion compensation layer
36 edge sealing
38 barrier film
40, 40' light guide layer
41 light source
42 scratch-resistant coating
44 frame
46 pressure plate
48 vacuum bag
50 additional substrate layer
52 print
54 adhesive layer
56 rolls

The invention claimed is:

1. A vehicle window pane, comprising:
a plate-like window pane body which has an outer side facing the surroundings of the vehicle and an inner side facing away from the outer side and on whose inner side a shading arrangement is disposed,
the shading arrangement being formed by a liquid crystal arrangement which comprises a liquid crystal cell,
wherein the liquid crystal arrangement comprises two films between which the liquid crystal cell is disposed and that the liquid crystal arrangement is connected to the window pane body via at least one longitudinal-expansion compensation layer,
wherein the liquid crystal arrangement is disposed between the window pane body and a window pane inner body,
wherein a polarizer layer is disposed between the window pane inner body and the liquid crystal arrangement or between the window pane body and the liquid crystal arrangement,
wherein the polarizer layer is connected to the liquid crystal arrangement via a second longitudinal-expansion compensation layer,
wherein the window pane body and the window pane inner body are curved, and
wherein the longitudinal-expansion compensation layers are elastic and compensate stresses which may occur between the window pane body and the liquid crystal arrangement because of differing thermal expansion behaviors.

2. The vehicle window pane according to claim 1, wherein the at least one longitudinal-expansion compensation layer comprises an acrylate layer, a layer of thermoplastic polyurethane, an epoxy layer, a silicone layer, a layer of a cross-linking material of ethylene-vinyl acetate (EVA), or a layer of a cross-linking material polyvinyl butyral (PVB).

3. The vehicle window pane according to claim 1, wherein the at least one longitudinal-expansion compensation layer has a thickness of at least 0.2 mm.

4. The vehicle window pane according to claim 1, wherein the window pane inner body is made of glass having a thickness between 0.1 mm and 1.5 mm.

5. The vehicle window pane according to claim 1, wherein the second longitudinal-expansion compensation layer comprises an acrylate layer of a layer of thermoplastic polyurethane, an epoxy layer, a silicone layer, a layer of a cross-linking material of ethylene-vinyl acetate (EVA), or a layer of a cross-linking material of polyvinyl butyral (PVB).

6. The vehicle window pane according to claim 1, wherein the second longitudinal-expansion compensation layer has a thickness of at least 0.2 mm.

7. The vehicle window pane according to claim 1, wherein the second longitudinal-expansion compensation layer has a refractive index that corresponds to the refractive index of the film of the liquid crystal arrangement.

8. The vehicle window pane according to claim 1, wherein a third longitudinal-expansion compensation layer is disposed between the window pane inner body and the polarizer layer or between the window pane inner body and the liquid crystal arrangement.

9. The vehicle window pane according to claim 8, wherein the third longitudinal-expansion compensation layer is an acrylate layer, a layer of thermoplastic polyurethane, an epoxy layer, a silicone layer, a layer of a cross-linking material of ethylene-vinyl acetate (EVA) or a layer of a cross-linking material of polyvinyl butyral (PVB).

10. The vehicle window pane according to claim 8, wherein the third longitudinal-expansion compensation layer has a thickness of at least 0.2 mm.

11. The vehicle window pane according to claim 1, further comprising an edge sealing which covers the edges of at least the liquid crystal arrangement and the longitudinal-expansion compensation layer and which is made of an acrylate layer, a layer of thermoplastic polyurethane, an epoxy layer, a silicone layer, a layer of a cross-linking material of ethylene-vinyl acetate (EVA), or a layer of a cross-linking material of polyvinyl butyral (PVB).

12. The vehicle window pane according to claim 1, wherein the two films of the liquid crystal arrangement are each formed by a film of PET or polycarbonate having a thickness between 50 µm and 250 µm.

13. The vehicle window pane according to claim 1, wherein the liquid crystal arrangement comprises a single liquid crystal cell.

14. The vehicle window pane according to claim 1, wherein the window pane body is made of glass or plastic.

15. The vehicle window pane according to claim 1, further comprising a light guide layer which is connectable to a light source via its edge.

16. The vehicle window pane according to claim 15, wherein the light guide layer is disposed on the side of the liquid crystal arrangement that faces away from the vehicle.

17. The vehicle window pane according to claim 15, wherein the light guide layer forms an inner visible surface of the vehicle window pane.

18. The vehicle window pane according to claim 15, wherein the light guide layer comprises a plane glass body.

19. The vehicle window pane according to claim 15, wherein the light guide layer comprises a plastic film, a plastic plate, or a combined plastic film and a plastic plate.

20. The vehicle window pane according to claim 15, wherein the light guide layer contains scattering centers formed by nanoparticles.

21. The vehicle window pane according to claim 15, wherein the light guide layer has a print.

22. The vehicle window pane according to claim 15, wherein the light guide layer further comprises a scratch-resistant coating.

23. The vehicle window pane according to claim 1, wherein at least one of the two films of the liquid crystal arrangement is provided with an additional substrate layer on the side facing away from the liquid crystal cell, wherein the additional substrate layer mechanically stabilizes the liquid crystal arrangement.

24. The vehicle window pane according to claim 23, wherein the additional substrate layer comprises a polyethylene layer, a polycarbonate layer, or a combined polyethylene layer and polycarbonate layer.

25. The vehicle window pane according to claim 23, wherein the additional substrate layer is connected to the respective film of the liquid crystal arrangement by an adhesive layer.

26. The vehicle window pane according to claim 24, wherein the additional substrate layer is laminated onto the respective film.

27. The vehicle window pane according to claim 1, wherein that the longitudinal-expansion compensation layers each have a thickness of at least 0.4 mm.

28. A method for producing a vehicle window pane, the method comprising the following steps of:
- preparing a structure made of multiple layers in a stack, the structure comprising a window pane body, a liquid crystal arrangement which comprises a liquid crystal cell and two films between which the liquid crystal cell is disposed, and a longitudinal-expansion compensation layer between the liquid crystal arrangement and the window pane body, at least the liquid crystal arrangement and the longitudinal-expansion compensation layer being placed in a frame which defines their position relative to each other;
- introducing the structure including the frame into a vacuum bag;
- evacuating the vacuum bag applying pressure to the vacuum bag so that the layers of the structure become joined;
- removing the composite structure from the vacuum bag;
- separating the composite structure from the frame after being removed from the vacuum bag; and
- providing the composite structure for use as a displaceable lid element of a sunroof or as a fixed roof element of a vehicle roof.

29. The method according to claim 28, further comprising the step of heating the structure while applying pressure to the vacuum bag.

30. The method according to claim 28, wherein the structure in the frame is covered with a pressure plate.

31. The method according to claim 28, wherein the structure comprises a window pane inner body.

32. The method according to any claim 28, wherein the structure comprises a polarizer layer.

33. The method according to claim 28, wherein the structure comprises a light guide layer.

34. The method according to claim 28, wherein at least one of the two films of the liquid crystal arrangement is provided with an additional substrate layer which mechanically stabilizes the liquid crystal arrangement.

* * * * *